United States Patent
Horesh et al.

(10) Patent No.: US 10,977,430 B1
(45) Date of Patent: Apr. 13, 2021

(54) SYSTEM AND METHOD FOR CORRECTION OF ACQUIRED TRANSACTION TEXT FIELDS

(71) Applicant: Intuit Inc., Mountain View, CA (US)

(72) Inventors: Yair Horesh, Kfar-Saba (IL); Yehezkel S. Resheff, Tel Aviv (IL); Rotem Rozenblum, Tel Aviv (IL); Shimon Shahar, Rishon-Letziyon (IL)

(73) Assignee: Intuit Inc., Mountain View, CA (US)

( * ) Notice: Subject to any disclaimer, the term of this patent is extended or adjusted under 35 U.S.C. 154(b) by 241 days.

(21) Appl. No.: 16/195,002

(22) Filed: Nov. 19, 2018

(51) Int. Cl.
*G06F 40/166* (2020.01)
*G06N 5/04* (2006.01)
*G06F 40/103* (2020.01)

(52) U.S. Cl.
CPC .......... *G06F 40/166* (2020.01); *G06F 40/103* (2020.01); *G06N 5/04* (2013.01)

(58) Field of Classification Search
None
See application file for complete search history.

(56) References Cited

U.S. PATENT DOCUMENTS

| | | | |
|---|---|---|---|
| 9,037,967 B1* | 5/2015 | Al-Jefri | G06F 40/232 715/257 |
| 10,380,210 B1* | 8/2019 | Lai | G06F 16/9535 |
| 2005/0210383 A1* | 9/2005 | Cucerzan | G06F 40/232 715/257 |
| 2008/0010605 A1* | 1/2008 | Frank | G06F 16/38 715/765 |
| 2014/0358519 A1* | 12/2014 | Mirkin | G06F 40/51 704/3 |
| 2017/0270416 A1* | 9/2017 | Sri | G06N 20/00 |

* cited by examiner

*Primary Examiner* — Alex Gofman
*Assistant Examiner* — Umar Mian
(74) *Attorney, Agent, or Firm* — Paradice and Li LLP

(57) ABSTRACT

Transactions include text fields, such as description fields. Transactions are extracted from financial institutions using web-scraping extraction. In the process of extracting transactions, errors can be introduced into text fields, such as the inclusion of a space within a word or the removal of a space between words. A statistical approach is applied to the text fields. When two alternative text fields are presented, the alternative that statistically includes more common tokens, such as unigrams and bigrams, is chosen as the correct alternative. The incorrect alternative is replaced by the correct alternative in the text field.

22 Claims, 11 Drawing Sheets

400

|  | 411 | 412 | 413 |
|---|---|---|---|
| 421 | ABCSTORE 2578 ABC BI ABC BILL WA | ABCSTORE ABC BI ABC BILL WA | ABCSTOREABCBIABCBILLWA |
| 422 | ABCSTORE 2578 ABC BILL ABC BILLWA | ABCSTORE ABC BILL ABC BILLWA | ABCSTOREABCBILLABCBILLWA |
| 423 | ABCSTORE 3762 ABC BILL ABC BILL WA | ABCSTORE ABC BILL ABC BILL WA | ABCSTOREABCBILLABCBILLWA |
| 424 | DEFSTORE MKTPLACE PMTS DEF BILL WA | DEFSTORE MKTPLACE PMTS DEF BILL WA | DEFSTOREMKTPLACEPMTSDEFBILLWA |
| 425 | DEFSTORE PMTS DEF BILL WA | DEFSTORE PMTS DEF BILL WA | DEFSTOREPMTSDEFBILLWA |
| 426 | MNOBANK ONLINE PYMT AUTH DATE 08-MAY | MNOBANK ONLINE PYMT AUTH DATE MAY | MNOBANKONLINEPYMTAUTHDATEMAY |
| 427 | MNOBANK ONLINE PYMT AUTHDATE 07-MAY | MNOBANK ONLINE PYMT AUTHDATE MAY | MNOBANKONLINEPYMTAUTHDATEMAY |
| 428 | MNOBANK ONLINE PYMT AUTHDATE 08-MAY | MNOBANK ONLINE PYMT AUTHDATE MAY | MNOBANKONLINEPYMTAUTHDATEMAY |
| 429 | MNOBANK ONLINE PYMT AUTHDATE 09-MAY | MNOBANK ONLINE PYMT AUTHDATE MAY | MNOBANKONLINEPYMTAUTHDATEMAY |
| 430 | MNOBANK ONLINE PYMT AUTH DATE 09-JUN | MNOBANK ONLINE PYMT AUTH DATE JUN | MNOBANKONLINEPYMTAUTHDATEJUN |

|     | 511      | 512 |
|-----|----------|-----|
| 521 | ABCSTORE | 3   |
| 522 | ABC      | 6   |
| 523 | BI       | 1   |
| 524 | BILL     | 6   |
| 525 | WA       | 4   |
| 526 | BILLWA   | 1   |
| 527 | DEFSTORE | 2   |
| 528 | MKTPLACE | 1   |
| 529 | PMTS     | 2   |
| 530 | DEF      | 2   |
| 531 | MNOBANK  | 5   |
| 532 | ONLINE   | 5   |
| 533 | PYMT     | 5   |
| 534 | AUTH     | 2   |
| 535 | DATE     | 2   |
| 536 | M        | 1   |
| 537 | AY       | 1   |
| 538 | AUTHDATE | 3   |
| 539 | MAY      | 3   |
| 540 | JUN      | 1   |

|     | 611 | 612 |
|-----|-----|-----|
| 621 | ABCSTORE\|ABC | 3 |
| 622 | ABC\|BI | 1 |
| 623 | BI\|ABC | 1 |
| 624 | ABC\|BILL | 5 |
| 625 | BILL\|WA | 5 |
| 626 | BILL\|ABC | 2 |
| 627 | DEFSTORE\|MKTPLACE | 1 |
| 628 | MKTPLACE\|PMTS | 1 |
| 629 | PMTS\|DEF | 2 |
| 630 | DEF\|BILL | 2 |
| 631 | DEFSTORE\|PMTS | 1 |
| 632 | MNOBANK\|ONLINE | 5 |
| 633 | ONLINE\|PYMT | 5 |
| 634 | PYMT\|AUTH | 2 |
| 635 | AUTH\|DATE | 2 |
| 636 | DATE\|M | 1 |
| 637 | M\|AY | 1 |
| 638 | PYMT\|AUTHDATE | 3 |
| 639 | AUTHDATE\|MAY | 3 |
| 640 | DATE\|JUN | 1 |
| 641 | ABC\|BILLWA | 1 |

| | 711 | 712 | |
|---|---|---|---|
| 721 | ABCSTOREABCBILLABCBILLWA | ABCSTORE ABC BILL ABC BILLWA | 731 |
| 722 | ABCSTOREABCBILLABCBILLWA | ABCSTORE ABC BILL ABC BILL WA | |
| 723 | MNOBANKONLINEPYMTAUTHDATEMAY | MNOBANK ONLINE PYMT AUTH DATE M AY | |
| 724 | MNOBANKONLINEPYMTAUTHDATEMAY | MNOBANK ONLINE PYMT AUTHDATE MAY | 732 |
| 725 | MNOBANKONLINEPYMTAUTHDATEMAY | MNOBANK ONLINE PYMT AUTHDATE MAY | |
| 726 | MNOBANKONLINEPYMTAUTHDATEMAY | MNOBANK ONLINE PYMT AUTHDATE MAY | |

| 801 | ABCSTOREABCBILLABCBILLWA | | | |
|---|---|---|---|---|
|  | 811 | 812 | 813 | 814 |
| 821 | ABCSTORE | ABCSTORE\|ABC | | |
| 822 | ABC | ABC\|BILL | | |
| 823 | BILL | BILL\|ABC | | |
| 824 | WA | ABC\|BILLWA | | |
| 825 | BILLWA | BILL\|WA | 1 / 5 = 0.2 | 5 / 1 = 5.0 |

| 901 | MNOBANKONLINEPYMTAUTHDATEMAY | | | |
|---|---|---|---|---|
|  | 911 | 912 | 913 | 914 |
| 921 | MNOBANK | MNOBANK\|ONLINE |  |  |
| 922 | ONLINE | ONLINE\|PYMT |  |  |
| 923 | PYMT | PYMT\|AUTH |  |  |
| 924 | AUTHDATE | AUTH\|DATE | 3 / 2 = 1.5 | 2 / 3 = 0.6 |
| 925 | AUTH | PYMT\|AUTHDATE |  |  |
| 926 | DATE | DATE\|M |  |  |
| 927 | MAY | M\|AY | 3 / 1 = 3.0 | 1 / 3 = 0.3 |
| 928 | M | AUTHDATE\|MAY |  |  |
| 929 | AY |  |  |  |

|  | 1011 | 1012 |
|---|---|---|
| 1021 | ABCSTORE 2578 ABC BILL ABC BILLWA | ABCSTORE 2578 ABC BILL ABC BILL WA |
| 1022 | MNOBANK ONLINE PYMT AUTH DATE 08-M AY | MNOBANK ONLINE PYMT AUTH DATE 08-MAY |

FIG. 10

SYSTEM AND METHOD FOR CORRECTION OF ACQUIRED TRANSACTION TEXT FIELDS

BACKGROUND

Many currently available personal and business data management systems help users manage their institutional account transactions. Such data management systems gather data related to account transactions of the users of the data management systems. The users can monitor many or all of their transactions and other matters from a single data management system. Such data management systems can help users save time by eliminating the need to check several different institutional accounts in order to manage their transactions. However, despite the convenience of monitoring many transactions within a single data management system, the account transactions that are gathered from various institutions, such as financial institutions, may contain discrepancies that impact the usefulness to the users of a single data management system.

It is desirable in traditional data management systems to provide users with consistent information related to similar transactions. However, in a traditional data management system, information stored as text fields of transaction data can include errors. A description field of a transaction is particularly vulnerable to the inclusion of errors. This is because traditional data management systems often gather transaction data that has been screen scraped using data extraction algorithms to extract relevant information.

Traditional data management systems often harvest structured and unstructured information that had been scraped from a web page, and convert that information into a form that can be stored in a central database. Such data extraction from a web page is commonly called web scraping. Web scraping allows for the collection of information from a web site without having to directly access any back-end databases. In some cases, traditional data management systems scrape information directly from a financial institution, using an extract-transform-load (ETL) process. In other cases, data has already been scraped by a third-party such as a financial clearinghouse or gateway, and a traditional data management system harvests such previously scraped data. It is to be understood that there are typically thousands of sources of transaction data. As a specific example, in the financial transaction domain, there are over 25,000 financial institutions from which data is scraped, and there is no standardization process to ensure accurate gathering of data across the financial institutions.

The difficulty of a scraping standardization process is thought to be due to the nature of the display of information on web sites. Web sites are generally intended to be displayed to an end-user and are not generally intended to be utilized for data transfers between software systems. Nevertheless, scraping is a data transfer process that can be at a semantic level or a syntactic level. Semantic level scraping utilizes a common framework for structured data. A web page may utilize a markup language such as Extensible Markup Language (XML) that promotes structured data with rules for encoding data that is both human-readable and machine-readable. A script may be created from a scripting language, and a script may extract well-formed XML content comprising data at the semantic level. Under some embodiments, a script comprises processing instructions. Such may be advantageous because a web page's Hypertext Markup Language (HTML) may change due to changes in the look and feel of the web page, yet the script can still extract the XML content at a semantic level. For example, the data may be presented in a systematic way through XML elements that convey the meaning of the data. Nevertheless, XML elements can be interpreted in different ways by different extraction algorithms.

On the other hand, syntactic level scraping refers to scraping data that is not presented in a systematic way. Web scraping at the syntactic level is often considered a manually intensive process to create scripts to extract information. For example, one may rely on knowledge of specific markup practices or document structures to determine data items among other web page elements. Such knowledge can be used to recognize data structures on a web page, and create a script to extract data at the syntactic level. Scraping data that is presented in a syntactic way can be prone to difficulties because, when a web page's layout or HTML changes, the script must often be rewritten in response to continue to scrape the web page at the syntactic level. Until the script is rewritten, the data that had been retrieved in the past can often no longer be retrieved.

It is to be appreciated that the harvesting of data that has been screen scraped is fraught with potential errors due, in part, to the lack of standardization of data extraction. One estimate is that there are over 1,500 different screen scraping publicly available tools, with each such tool having its own unique and independent code base. Often, each programmer writes different code segments to scrape information, which often leads to inconsistency as to how data tokens are combined and divided using delimiters. For example, a text field may be split into several different fields by one programmer, while several different fields may be stitched together into one field by another programmer. Such variance in stitching and splitting can be due to several reasons, such as logic that is implemented on a website or even a technical reason where a certain number of characters, such as 25 or 35, causes an automatic end to a first field and a start of a second field. As a result, harvested text fields occasionally contain incorrect delimiters separating tokens of the text fields.

For example, a text field may correctly contain text, such as "Debit Card Purchase May-05 NYCDOT PARKING METERS NEW YORK CITY NY." In this example, a screen scraping application included the correct delimiter of spaces between the tokens of the text. However, in another example, a text field may contain text with inconsistencies, such as "Debit CardPurchase May-05 PARKING METERS NEW YORK CITY NY." In this example, a delimiter of a space between "Card" and "Purchase" is missing such that the two tokens are stitched together. Furthermore, a delimiter of a space between "M" and "ay" has been inserted, resulting in the token of "May" being split into two tokens. As shown in this example, the splitting and stitching together of tokens of a text field can result in improper parsing of merchant information, date information, the place of the transaction, and other description information as discussed herein, or as known in the art at the time of filing, or as developed, or becomes available, after the time of filing.

One estimate is that such inconsistencies of delimitation, such as inserting or removing spaces, occurs within one to two percent of transactions harvested by a traditional data management system. In some cases, the inconsistency is caused by a single entity, such as the entity performing a screen scrape. For example, screen scraping applications are thought to have difficulties including the correct space after a number that ends with the numeral five, which may be interpreted as the letter "S," or the numeral zero, which may be interpreted as the letter "0."

In other cases, inconsistencies are created by a chain of entities. For example, a credit card institution may start with text in a description field of "Purchase from ABC Store." Next, a clearinghouse institution may append text to the description of "APR 13 DEBIT CARD" to indicate a charge to the debit card. In this example, the appended text does not have a leading space and the description would then be "Purchase from ABC StoreAPR 13 DEBIT CARD." Next, a screen scraping module of a traditional data management system may extract the text from the clearinghouse institution, and in the process, insert a space before "PR" and following "ABC StoreA," resulting in a text field of "Purchase from ABC StoreA PR 13 DEBIT CARD." In this example, both the name of the merchant and the date of the transaction are impacted by delimitation errors, such as the absence of a proper space and the inclusion of an improper space.

Consequently, there is a significant need for a technical solution to the long-standing technical problem of acquiring imprecisely scraped transaction text fields of data management systems.

SUMMARY

Embodiments of the present disclosure provide a technical solution to the technical problem of acquiring imprecisely scraped transaction text fields of data management systems. The disclosed technical solution includes correction of acquired transaction text fields.

In one embodiment, the technical solution to the technical problem of acquiring imprecisely scraped transaction text fields of data management systems includes extracting transactions from institutions using web-scraping extraction. In the process of extracting such transactions, errors can be introduced into text fields, such as the inclusion of a space within a word or the removal of a space between words. In one embodiment, a statistical approach is applied to the text fields. In one embodiment, when two alternative text fields are presented, the alternative that statistically includes more common tokens, such as unigrams and bigrams, is chosen as the correct alternative. In one embodiment, the incorrect alternative is replaced by the correct alternative in the text field.

In one embodiment, a statistical approach is utilized to remove or add spaces from text fields of transaction data. In one embodiment, similar text fields are compared, and the text token of text fields that is most common is selected as the correct token. In one embodiment, similar text fields are examined for an incorrectly inserted space in a text field, and the incorrectly inserted space is removed. In one embodiment, similar text fields are examined for a missing space in a text field, and the missing space is inserted. In one embodiment, counts of single tokens and pairs of tokens of a selection of text fields are determined, and such counts are utilized to determine which text tokens are more common and which text tokens are less common.

In one embodiment, an assumption is made that the transaction data acquired from the financial institutions is generally correct. This assumption provides for the creation of two indexes in which a frequency of tokens is determined based on counting the tokens. In one embodiment, this assumption provides for finding a less frequent token of a text field that is inconsistent and replacing that token with a more frequent token that is likely to be correct because it is a more frequent token.

In one embodiment, transaction text field data is acquired. In one embodiment, the transaction text field data represents text fields of transactions acquired by a data management system. In one embodiment, key text field group data is selected from the transaction text field data. In one embodiment, the key text field group data represents a text field grouping of the transaction text field data. In one embodiment, the key text field group data is based on an association with associated key text data. In one embodiment, the associated key text data is based on disregarding numeric characters, such as digits, and disregarding delimiter characters, such as spaces.

In one embodiment, a corresponding unigram of the key text field group is compared to a corresponding bigram of the key text field group. In one embodiment, a unigram is a single token. In one embodiment, a bigram is two contiguous tokens separated by a delimiter, in which the separating delimiter is disregarded when comparing a bigram to a unigram.

In one embodiment, the comparison determines a text correction. In one embodiment, the text correction is based on a statistical inference. In one embodiment, the statistical inference is based on a respective unigram frequency of the transaction text field data and a respective bigram frequency of the transaction text field data. In one embodiment, the statistical inference is based on the respective unigram frequency being greater than the respective bigram frequency. In one embodiment, the statistical inference is based on the respective bigram frequency being greater than the respective unigram frequency. In one embodiment, the unigram frequency and the bigram frequency are based on disregarding numeric characters, such as digits. In one embodiment, the unigram frequency is based on a count of unigrams and the bigram frequency is based on a count of bigrams.

In one embodiment, the text correction is applied to the transaction text field data. In one embodiment, the application of the text correction generates transaction text field correction data. In one embodiment, the text correction represents a correction to the transaction text field data. In one embodiment, the text correction is based on a statistical inference. In one embodiment, the text correction is based on replacing, in the transaction text field data, the corresponding unigram with the corresponding bigram, in which the corresponding bigram includes a delimiter, such as a space, between the two tokens of the bigram. In one embodiment, the text correction is based on replacing, in the transaction text field data, the corresponding bigram with the corresponding unigram, in which the corresponding bigram includes a delimiter, such as a space, between the two tokens of the bigram.

In one embodiment, the text correction is restricted to group unigrams and group bigrams of the key text field group data. In one embodiment, a group unigram is a member of the key text field group data. In one embodiment, a group bigram is a member of the key text field group data. In one embodiment, tokens that already exist in the key text field group data are utilized in the text correction. In one embodiment, non-existent tokens of the key text field group data are restricted from being utilized as a replacement token in the text correction.

BRIEF DESCRIPTION OF THE DRAWINGS

FIG. 4 is a specific illustrative example of text field data for correction of acquired transaction text fields, in accordance with one embodiment.

FIG. 5 is a specific illustrative example of unigram index data for correction of acquired transaction text fields, in accordance with one embodiment.

FIG. 6 is a specific illustrative example of bigram index data for correction of acquired transaction text fields, in accordance with one embodiment.

FIG. 7 is a specific illustrative example of key text group data for correction of acquired transaction text fields, in accordance with one embodiment.

FIG. 8 is a specific illustrative example of pair ratio data for correction of acquired transaction text fields, in accordance with one embodiment.

FIG. 9 is a specific illustrative example of pair ratio data for correction of acquired transaction text fields, in accordance with one embodiment.

FIG. 10 is a specific illustrative example of corrected transaction data for correction of acquired transaction text fields, in accordance with one embodiment.

Figure 1:
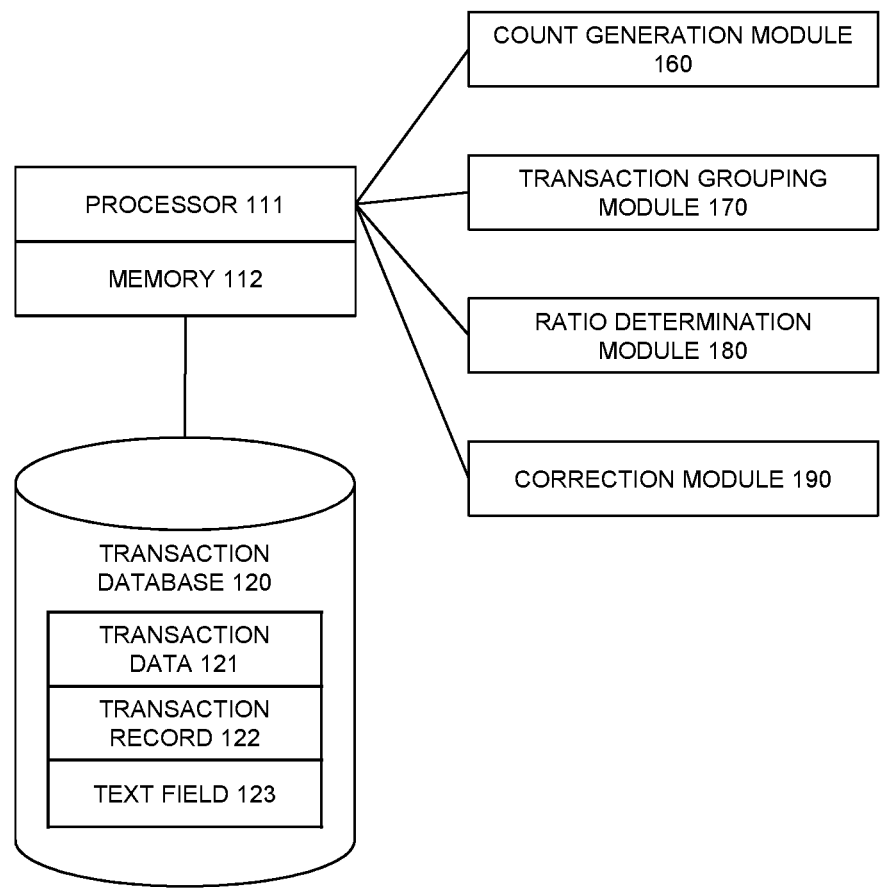
FIG. 1 is a transaction text field correction module for correction of acquired transaction text fields, in accordance with one embodiment.

Common reference numerals are used throughout the figures and the detailed description to indicate like elements. One skilled in the art will readily recognize that the above figures are examples and that other architectures, modes of operation, orders of operation, elements, and functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Overview

As discussed in more detail below, embodiments of the present disclosure represent a technical solution to the technical problem of acquiring imprecisely scraped transaction data description fields of data management systems. In one embodiment, the technical solution to the technical problem of acquiring imprecisely scraped transaction text fields of data management systems includes extracting financial transactions from financial institutions using web-scraping extraction. In the process of extracting such financial transactions, errors can be introduced into description fields, such as the inclusion of a space within a word or the removal of a space between words. In one embodiment, a statistical approach is applied to the description fields. In one embodiment, when two alternative description fields are presented, the alternative that statistically includes more common tokens, such as unigrams and bigrams, is chosen as the correct alternative. In one embodiment, the incorrect alternative is replaced by the correct alternative in the description field.

FIG. 1 is a transaction text field correction module 100 for correction of acquired transaction text fields, in accordance with one embodiment. In one embodiment, the transaction text field correction module 100 includes a processor 111 and a memory 112. In one embodiment, the memory 112 includes a transaction database 120 that stores transaction data 121. In one embodiment, the transaction data 121 comprises transactions of a data management system.

In one embodiment, the transaction database 120 includes a plurality of transaction records 122. In one embodiment, a transaction record 122 includes a text field 123. It is to be understood that while a single text field 123 is depicted in FIG. 1, a transaction record may include a plurality of text fields 123 containing various types of information.

In one embodiment, a text field 123 may include transaction description information. In one embodiment, a text field 123 of a description includes text that was created by one or more financial institutions and associated third parties including merchants and clearinghouses. In one embodiment, a text field 123 of a description provides information about a transaction, such as a merchant name, a date of the transaction, the method of payment, the location of the transaction, and other description information as discussed herein, or as known in the art at the time of filing, or as developed, or becomes available, after the time of filing. In one embodiment, description information assists a user in understanding a transaction at a later point in time, as well as assists a machine learning module to analyze the transaction.

In one embodiment, a text field 123 includes transaction user information. In one embodiment, user information includes a user identifier that uniquely identifies a user of the data management system. In one embodiment, user information includes the name of the user, such as the user's legal name or the name by which the user is known, such as the user name as identified by a merchant.

In one embodiment a text field 123 includes transaction date information. In one embodiment, date information identifies a date that a transaction was made by a user. In one embodiment, date information identifies a date that a financial institution receives or processes information about a transaction made by a user. In one embodiment, date information includes a time with a date.

In one embodiment, a text field 123 includes transaction merchant information. In one embodiment, merchant information includes a merchant identifier that uniquely identifies a merchant that engaged in a transactional relationship with a user. In one embodiment, merchant information includes the name of the merchant, such as the legal name of the merchant or the name by which the merchant is known.

In one embodiment, a text field 123 includes transaction category information. In one embodiment, category information includes a label of a transaction, such as an account name. In one embodiment, category information is associated with a budget goal by which actual amounts of a category can be compared against budgeted amounts of that category. In one embodiment, category information can include a hierarchy of categories, such that a category may be a subcategory of another category.

In one embodiment, category information includes income, expense, and other categories as discussed herein, or as known in the art at the time of filing, or as developed, or becomes available, after the time of filing. In one embodiment an income category may include paycheck, investment, returned purchase, bonus, interest income, reimbursement, rental income, and other income categories as discussed herein, or as known in the art at the time of filing, or as developed, or becomes available, after the time of filing. In one embodiment, an expense category includes entertainment (including arts, music, movies & DVDs, and newspapers & magazines), education (including tuition, student loan, and books & supplies), shopping (including clothing, books, electronics & software, hobbies, and sporting goods), personal care (including laundry, hair, and spa & massage), health & fitness (including dentist, doctor, eye care, pharmacy, health insurance, gym, and sports), kids (including activities, allowance, baby supplies, babysitter & daycare, child support, and toys), food & dining (including groceries, coffee shops, fast food, restaurants, and alcohol), gifts & donations (including gift and charity), investments (including deposit, withdrawal, dividends & cap gains, buy, and sell), bills & utilities (including television, home phone, internet, mobile phone and utilities), auto & transport (including gas & fuel, parking, service & auto parts, auto payment, and auto insurance), travel (including air travel, hotel, rental car & taxi, and vacation), fees & charges (including service fee, late fee, finance charge, ATM fee, bank fee, and commissions), business services (including advertising, office supplies, printing, shipping, and legal), taxes (including federal tax, state tax, local tax, sales tax, and property tax), and other expense categories as discussed herein, or as known in the art at the time of filing, or as developed, or becomes available, after the time of filing.

In one embodiment, the category information is derived from the description information. In one embodiment, an automatic categorization engine of the data management system (not shown in FIG. 1) parses the description information in order to derive the category information, as discussed herein, or as known in the art at the time of filing, or as developed, or becomes available, after the time of filing. In one embodiment, an automatic categorization engine can extract the name of a merchant from a description field, and based on that name, determine a categorization for the transaction. For example, the extraction of a grocery store name can lead to the determination of a grocery category. It is to be understood that automatic categorization engines are well known by those having ordinary skill in the art of transaction categorization, and that any automatic categorization engine may be utilized as discussed herein, or as known in the art at the time of filing, or as developed, or becomes available, after the time of filing.

In one embodiment, the memory 112 includes instructions stored therein and which, when executed by the processor 111, performs a process. In one embodiment, the transaction text field correction module 100 includes instructions representing a count generation module 160, a transaction grouping module 170, a ratio determination module 180, and a correction module 190.

In one embodiment, the count generation module 160 generates statistics related to the text fields 123 of the transaction records 122. In one embodiment, the transaction database 120 may include a multitude of transaction records 122 acquired from various financial institutions, in which each of the transaction records 122 includes a text field 123, such as a transaction description field. In one embodiment, a number of transaction records 122 is selected by the count generation module 160, such as a block of one hundred thousand to a million transaction records 122. It is to be understood that any number of transaction records 122 can be selected, including all of the transaction records 122 that are stored at the transaction database 120.

In one embodiment, a transaction record 122 comprises at least one text field 123, such as a description field, and other text fields as discussed herein, or as known in the art at the time of filing, or as developed, or becomes available, after the time of filing. In one embodiment, transaction data 121 is acquired from at least one financial institution, such as acquiring transaction data 121 through web scraping or other acquisition processes that cause delimitation errors as discussed herein, or as known in the art at the time of filing, or as developed, or becomes available, after the time of filing. In one embodiment, statistical analysis is performed on a portion of the acquired transactions, such as one hundred thousand transactions, one million transactions, all of the transactions, and other portions of transactions as discussed herein, or as known in the art at the time of filing, or as developed, or becomes available, after the time of filing.

In one embodiment, an assumption is made in terms of delimiters that a high percentage, such as over 95%, of the text fields of the acquired transactions are accurate, and correspondingly, that a low percentage of the text fields are inaccurate. In one embodiment, the inaccuracy is at least one incorrect spacing, and in other embodiments, the inaccuracy relates to other forms of delimiters such as tabs, commas, semicolons, and other text delimiters as discussed herein, or as known in the art at the time of filing, or as developed, or becomes available, after the time of filing.

In one embodiment, a set of transactions is selected, such as a set of a million transactions. In one embodiment, all of the text fields of the set of transactions is copied to a first stripped text field data store of numeric-less fields with the removal of numeric characters such as digits, commas, hyphens, periods, dollar signs, slashes and other numeric characters as discussed herein, or as known in the art at the time of filing, or as developed, or becomes available, after the time of filing. As a specific illustrative example, if a text field includes "Purchase date 5/25," then the copy is "Purchase date," which includes the space after the token "date" but does not include "5/25." In one embodiment, the numeric characters are removed to normalize the text fields.

In one embodiment, statistics are generated by the count generation module 160 from the first stripped text field data store of text fields with numeric characters removed. In one embodiment, the statistics are based on the unigrams and the bigrams of the numeric-less fields. In one embodiment, a unigram is a single token of a text field that is delimited by a text delimiter such as a space, where it is to be understood that the first and last token need not respectively begin or end with a space. For example, the text of "Purchase from ABC Store" has four unigrams of "Purchase," "from," "ABC," and "Store." In one embodiment, a bigram is a coupling of two contiguous tokens of a text field that is delimited by a text delimiter such as a space, where it is to again be understood that the first and last token need not respectively begin with a space. For example, the text of "Purchase from ABC Store" has three bigrams of "Purchase|from," "from|ABC," and "ABC|Store," in which the space between the two tokens are not analyzed in the bigram, yet the position of the space is illustrated with a vertical line for illustrative purposes. It is to be understood that although unigrams and bigrams are explained in the disclosed embodiments, any size "n-gram" could be utilized such as a trigram. For example, the text of "Purchase from ABC Store" has two trigrams of "Purchase|from|ABC" and "from|ABC|Store."

In one embodiment, after numeric characters are removed from each text field of the selected transactions, and unigrams and bigrams are determined from such, the counts of the unigrams and the bigrams are determined by the count generation module 160. For example, if there were ten selected transactions, and four of the transaction text fields contain the token of "Purchase," then the count for the unigram of "Purchase" would be four. For further example, if there were ten selected transactions, and three of the transaction text fields contain the contiguous tokens of "Purchase" and "from," then the count for the bigram of "Purchase|from" would be three. In one embodiment, each unique unigram of the selected transactions and the respective count is stored for use later. Similarly, in one embodiment, each unique bigram of the selected transactions and the respective count is also stored for use later. In one embodiment, the counts of unigrams are stored in a unigram index data store and the counts of bigrams are stored in a bigram index data store.

In one embodiment, each text field of the set of transactions is copied to a second stripped text field data store of numeric-less and delimiter-less text fields, with the removal of numeric characters and delimiter characters. In one embodiment, digits and spaces are removed from the text tokens. For example, a text field of "Purchase from ABC Store 09-Aug" would be copied to "PurchasefromABCStoreAug." In this example, the numeric information of "09-" was removed and the spaces between the tokens were removed. In one embodiment, such numeric-less and delimiter-less text fields are considered key texts and are used by the transaction grouping module 170 to create groups of text fields that have the same key texts. For example, a first text field of "Purchase from ABC Store 09-Aug" would have the same key text as a second text field of "Purchase from ABC Store 10-Aug," even though there is no space between "ABC" and "Store" and the numeral is "10." Both the first and second text field would be a member of the same key text field group because they share the same key text of "PurchasefromABCStoreAug." It is to be understood that, based on the set of selected transactions, there may be a large number of key text data and a large number of respective key text field group data.

In one embodiment, the transaction grouping module 170 iterates over each key text. In one embodiment, each key text represents a match of equivalent instances of text fields without numeric characters and delimiter characters. In one embodiment, the number of key texts is the number of unique strings of a text field after the numeric characters and delimiter characters are stripped out. In one embodiment, the transaction grouping module 170 detects an inconsistency within the members of the key text field group data for each key text being iterated. In one embodiment, an inconsistency is inconsistent delimiters, such as spaces, when a numeric-less text field is compared to another numeric-less text field and a difference in a delimiter is detected. In one embodiment, if an inconsistency is detected, then the ratio determination module 180 is utilized. In one embodiment, if an inconsistency is not detected, then no correction is made, and the next key text can be iterated.

In one embodiment, the transaction grouping module 170 restricts corrections of text fields to tokens that exist within a key text field group. Even if a unigram or a bigram appears more frequently than the other in the first stripped text field data, in one embodiment it is required that an instance of the correct token exist within a respective key text field group comprising similar descriptions. In one embodiment, even if the most frequent instances of either a bigram appears more than a unigram or a unigram appears more than a bigram, in one embodiment, a constraint is added. In one embodiment, the constraint is that when text fields are grouped based on key text, an instance of a token that will replace another is required to exist within the grouped text fields. In one embodiment, the constraint prevents the transaction text field correction module 100 from creating a token that is not already used within a group. In one embodiment, the constraint prevents a token from another context being used in the context of an unrelated key text field group.

In one embodiment, the ratio determination module 180 pairs all unigrams of the key text field group data and all bigrams of the key text field group data. In one embodiment, the ratio determination module 180 determines which of the pairs have a corresponding group unigram and a corresponding group bigram. In one embodiment, a corresponding group unigram and a corresponding group bigram are equivalent. For example, a unigram of "May" corresponds to a bigram of "M|ay" because both are equivalent without spaces.

In one embodiment, the corresponding group unigram is found in the unigram index data store and the respective unigram count is applied to a pair ratio. In this embodiment, the corresponding group bigram is found in the bigram index data store and the respective bigram count is applied to the pair ratio. For example, if a unigram count for "May" is 335,872 and the bigram count for "M|ay" is 327, then the ratio of unigram count to bigram count exceeds a threshold value of 1.5, and the ratio determination module 180 can determine that a correction to the bigram is appropriate.

In one embodiment, the correction module 190 generates corrected text field data based on the pair ratio. In one embodiment, if the pair ratio indicates that a unigram count exceeds a bigram count by a threshold value, then the correction module 190 replaces the bigram with the unigram. In one embodiment, if the pair ratio indicates that a bigram count exceeds a unigram count by a threshold value, then the correction module 190 replaces the unigram with the bigram. In one embodiment, such a replacement either adds a delimiter to a text field or removes a delimiter from a text field.

In one embodiment, the correction module 190 generates corrected text field data. In one embodiment, the corrected text field data includes the text field before a correction and the text field after the correction. In one embodiment, the corrected text field data includes the token before a correction and the token after the correction. In one embodiment, the corrected text field data is used as a record of changes made to text fields. In one embodiment, the corrected text field data is used to train a machine learning correction model to determine appropriate pairs of unigrams and bigrams and inappropriate pairs of unigrams and bigrams. In one embodiment, the machine learning correction model can make corrections to text fields of transactions in real time as each transaction is received. In one embodiment, the corrected text field data is utilized to train a machine learning model in a supervised environment.

In one embodiment, the corrected text field data can be utilized as input to train a machine learning model, which can then correct individual transactions. In one embodiment, the corrected text field data is utilized as a signal for a supervised machine learning module. In one embodiment, a supervised machine learning module is trained to generalize the correction of text in a text field. In one embodiment, a supervised machine learning module generates a mapping between original text and corresponding corrected text, based, for example, on a sequence-to-sequence learning model, and other learning models as discussed herein, or as known in the art at the time of filing, or as developed, or becomes available, after the time of filing.

Embodiments of the present disclosure provide highly efficient, effective, and versatile systems and methods for correction of acquired transaction text fields. However, the disclosed embodiments do not encompass, embody, or preclude other forms of innovation in the area of transaction harvesting systems and methods.

In addition, the disclosed embodiments of systems and methods for correction of acquired transaction text fields are not abstract ideas for at least several reasons.

First, the disclosed systems and methods for correction of acquired transaction text fields are not abstract ideas because they are not merely an idea itself (e.g., can be performed mentally or using pen and paper). For example, with a traditional data management system, after having harvested transactions containing inconsistencies in delimitations of tokens, such as spaces delimiting words, a traditional solution is to make manual corrections by having a user of the traditional data management system examine a text field and make the appropriate correction. For example, if a text field contains "ABCBank," a user would need to mentally determine that a space is missing in the text and then correct the text field by manually inserting a space between "ABC" and "Bank" by, for example, moving a mouse to locate a cursor after the letter "C" and pressing on the keyboard the spacebar key to yield the corrected "ABC Bank."

It is to be understood that if an inconsistency is encountered one to two percent of the time in harvested transactions, the volume of manual corrections of billions of transactions would be an enormous undertaking using mental capabilities or pen and paper. The result in traditional data management systems is that the volume of corrections is so large that users do not take the time and energy to make the corrections. Accordingly, with a traditional data management system, the use of manual efforts to correct delimitation problems in harvested text fields is costly in terms of human resources. In contrast, the disclosed embodiments utilize statistical inferences to make corrections to acquired text fields without user intervention. Due to the large amount of transaction data and the complexity of statistic inference determination and application, the human mind cannot make such a determination of a text field correction even with the aid of pen and paper.

Second, the disclosed systems and methods for correction of acquired transaction text fields are not abstract ideas because they are not a fundamental economic practice (e.g., are not merely creating a contractual relationship, hedging, mitigating a settlement risk, etc.). In contrast, the disclosed embodiments provide for the capability of determining categories for transactions based on the respective text fields, such as description fields. For example, a category may be determined to be "groceries" for a grocery store having the name of "ABC Store" in a text field, such as a description text field. If a screen scraping module incorrectly inserts a space between "A" and "BC," then the resulting text field is "A BC Store." In this example, a data management system may remove the letter "A" because it may determine it to be a word acting as a determiner, such as the words "the" and "an." In this example, a data management system may not recognize the "BC Store" and will not be able to correctly determine the category of "groceries."

It is to be understood that the categorization of transactions enables economic practices such as enabling users to create financial budgets and plan their economic futures, such as sending dependents to college. The disclosed embodiments do not represent merely the act of creating a financial budget but are rather a means to enable, for example, an economic practice of a user to enhance the control of the user's finances based on accurate categorization.

Third, the disclosed systems and methods for correction of acquired transaction text fields are not abstract ideas because they are not a method of organizing human activity (e.g., managing a game of bingo), but are rather, in one embodiment, a mechanism to prevent a user from viewing improperly scraped transactions that are harvested by a data management system. For example, under a traditional data management system, a user may view a text field that improperly shows a date of "J an 19" and not realize that "J an" is an improperly parsed text of the month January that was intended to be described as "Jan." Under this example of a traditional data management system, repetitively viewing incorrect text fields may cause a user to ignore the information contained in the text field to the detriment of the user not being able to take advantage of such information. In contrast, the disclosed embodiments provide for the correction of such improperly scraped text fields, which does not organize the human activity of the user, but rather enables the user to improve the user's understanding of the user's transactions. Such may also improve a user's financial position through the improved understanding of the transactions based, for example, on the correction of the text fields.

Fourth, although mathematics may be used in the disclosed systems and methods for correction of acquired transaction text fields, the disclosed and claimed systems and methods are not abstract ideas because they are not simply a mathematical relationship/formula. In contrast, utilization of the disclosed embodiments results in the tangible effect of enabling machine learning modules to operate on the transactions. In one embodiment, machine learning modules utilize the corrected text fields to make determinations about the transactions that aid the user.

For example, a machine learning module may seek to prevent a user from having a non-sufficient funds (NSF) event due to a user entering into a transaction that depletes a user's bank account. In this example, to prevent an NSF event, an artificial intelligence engine may depend on corrected text fields, such as text fields that contain a bank's name, in order to aid a user in avoiding NSF events. In one embodiment, statistical inferences are utilized to determine appropriate corrections to text fields, and such statistical inferences have the tangible effect of reducing processor workloads of artificial intelligence engines. Such reduced processor workloads may be due to the enablement of artificial intelligence engines to more efficiently make more accurate determinations based on more accurate text fields that have been corrected based on the disclosed embodiments.

Exemplary Process

Figure 2A:
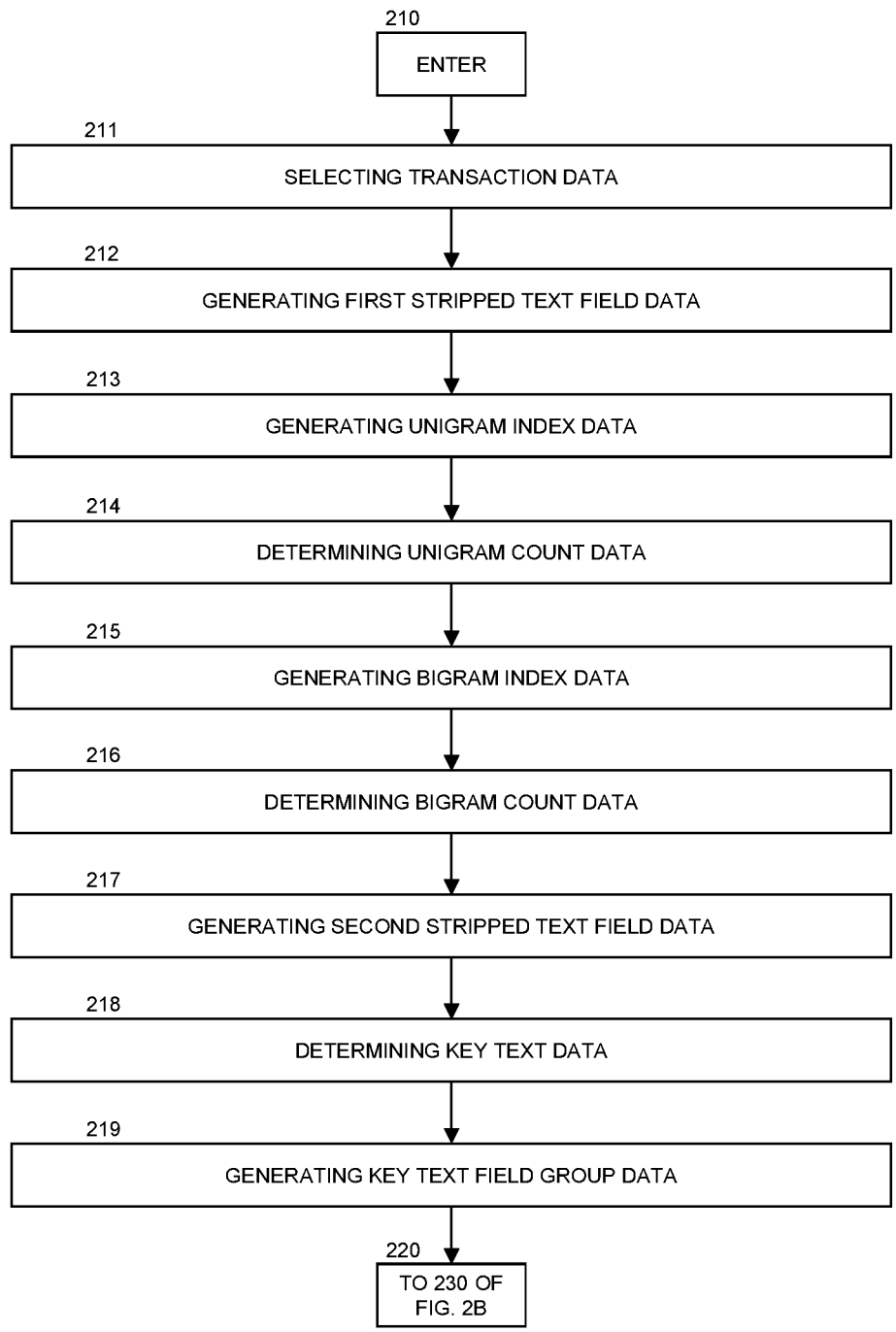
FIGS. 2A and 2B are flow diagrams of a process for correction of acquired transaction text fields, in accordance with one embodiment.
Figure 2B:
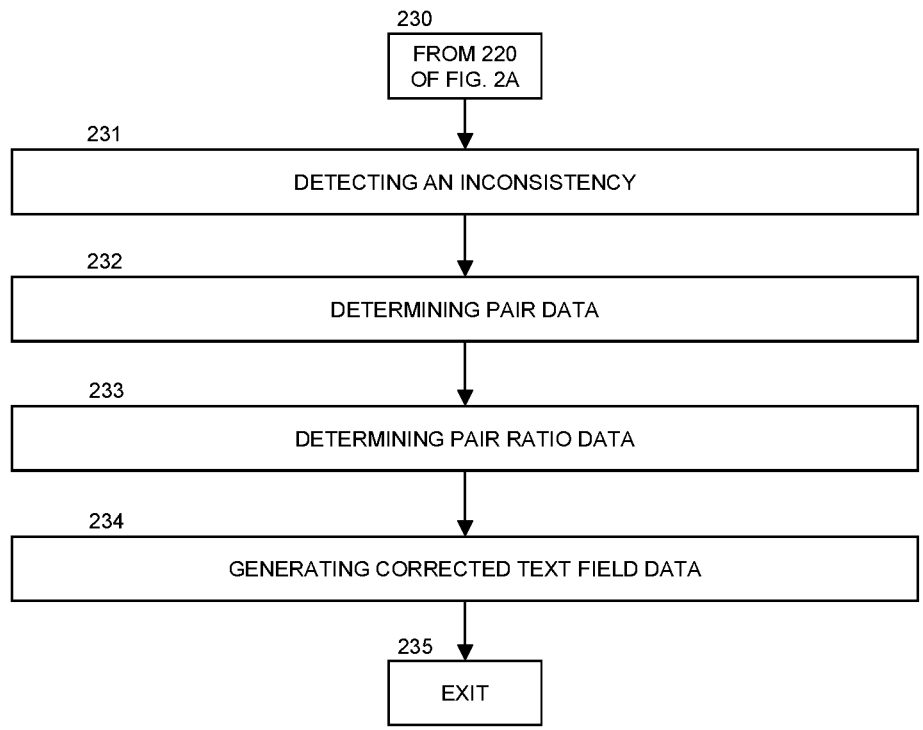

FIGS. 2A and 2B are flow diagrams of a process for correction of acquired transaction text fields, in accordance with one embodiment. Referring to FIGS. 1, 2A, and 2B together, the process 200 for correction of acquired transaction text fields begins at ENTER OPERATION 210 and process flow proceeds to SELECTING TRANSACTION DATA OPERATION 211.

In one embodiment, at SELECTING TRANSACTION DATA OPERATION 211, the count generation module 160 selects transaction data. In one embodiment, the transaction data represents a set of transactions of a data management system. In one embodiment, the transaction data comprises transaction text field data. In one embodiment, the transaction text field data represents text fields of the set of transactions.

In one embodiment, the transaction data is derived from a plurality of web scraping algorithms. In one embodiment, delimiter errors are introduced into the transaction field data by the web scraping algorithms. In one embodiment, the set of transaction data comprises more than one hundred transactions. In one embodiment, the set of transaction data comprises more than one million transactions. In one embodiment, the number of transactions in the selected set of transactions is sufficiently large to be a sample from which the frequency of common tokens can be determined. In one embodiment, a first set of transactions is selected in order to correct a first set of text fields, followed by a second set of transactions being selected in order to correct a second set of text fields. In one embodiment, the text fields are descriptions of the transactions.

In one embodiment, once the transaction data is selected at SELECTING TRANSACTION DATA OPERATION 211, process flow proceeds to GENERATING FIRST STRIPPED TEXT FIELD DATA OPERATION 212.

In one embodiment, at GENERATING FIRST STRIPPED TEXT FIELD DATA OPERATION 212, the count generation module 160 generates first stripped text field data. In one embodiment, the first stripped text field data is generated from the transaction text field data. In one embodiment, the transaction text field data represents text fields with numeric characters removed. In one embodiment, the numeric characters comprise digit characters. In one embodiment, the numeric characters comprise digit characters and punctuation characters.

In one embodiment, the first stripped text field data has the same number of data fields as the selected transaction data. In one embodiment, there are pointers connecting each text field of the first stripped text field data that points to the respective text field of the selected transaction data. In one embodiment, the pointers allow for correcting the text field of the selected transaction data based on an analysis of the text field of the first stripped text field data.

In one embodiment, once the first stripped text field data is generated at GENERATING FIRST STRIPPED TEXT FIELD DATA OPERATION 212, process flow proceeds to GENERATING UNIGRAM INDEX DATA OPERATION 213.

In one embodiment, at GENERATING UNIGRAM INDEX DATA OPERATION 213, the count generation module 160 generates unigram index data. In one embodiment, the unigram index data is generated based on the first stripped text field data. In one embodiment, the unigram index data represents extracted unigrams from the text fields with numeric characters removed. In one embodiment, an extracted unigram is a single token of a text field. In one embodiment, the unigram index data comprises distinct unigrams that are extracted from the first stripped text field data.

In one embodiment, once the unigram index data is generated at GENERATING UNIGRAM INDEX DATA OPERATION 213, process flow proceeds to DETERMINING UNIGRAM COUNT DATA OPERATION 214.

In one embodiment, at DETERMINING UNIGRAM COUNT DATA OPERATION 214, the count generation module 160 determines unigram count data. In one embodiment, the unigram count data is determined based on the unigram index data. In one embodiment, the unigram count data is determined based on the first stripped text field data. In one embodiment, the unigram count data represents unigram counters of the extracted unigrams. In one embodiment, the unigram counters are a statistic that provides information about the frequency of the unigram within the stripped text field data. In one embodiment, a unigram counter with a large count is considered more likely to indicate a correct unigram than a unigram counter with a small count.

In one embodiment, once the unigram count data is determined at DETERMINING UNIGRAM COUNT DATA OPERATION 214, process flow proceeds to GENERATING BIGRAM INDEX DATA OPERATION 215.

In one embodiment, at GENERATING BIGRAM INDEX DATA OPERATION 215, the count generation module 160 generates bigram index data. In one embodiment, the bigram index data is generated based on the first stripped text field data. In one embodiment, the bigram index data represents extracted bigrams from the text fields with numeric characters removed. In one embodiment, an extracted bigram represents two contiguous tokens of a text field. In one embodiment, the bigram index data comprises distinct bigrams that are extracted from the first stripped text field data.

In one embodiment, once the bigram index data is generated at GENERATING BIGRAM INDEX DATA OPERATION 215, process flow proceeds to DETERMINING BIGRAM COUNT DATA OPERATION 216.

In one embodiment, at DETERMINING BIGRAM COUNT DATA OPERATION 216, the count generation module 160 determines bigram count data. In one embodiment, the bigram count data is determined based on the bigram index data. In one embodiment, the bigram count data is determined based on the first stripped text field data. In one embodiment, the bigram count data represents bigram counters of the extracted unigrams. In one embodiment, the bigram counters are a statistic that provides information about the frequency of the bigram within the stripped text field data. In one embodiment, a bigram counter with a large count is considered more likely to indicate a correct bigram than a bigram counter with a small count.

In one embodiment, once bigram count data is determined at DETERMINING BIGRAM COUNT DATA OPERATION 216, process flow proceeds to GENERATING SECOND STRIPPED TEXT FIELD DATA OPERATION 217.

In one embodiment, at GENERATING SECOND STRIPPED TEXT FIELD DATA OPERATION 217, the transaction grouping module 170 generates second stripped text field data. In one embodiment, the second stripped text field data is generated from the transaction text field data. In one embodiment, the second stripped text field data represents the text fields with both numeric characters and delimiter characters removed. In one embodiment, the delimiter characters comprise space characters. In one embodiment, the delimiter characters comprise space characters and punctuation characters.

In one embodiment, the second stripped text field data represents text fields in which all the tokens of each text field are combined into one token. In one embodiment, a token is a group of contiguous characters, such as a word, that are delimited by a delimiter, such as a space or punctuation. In one embodiment, if five tokens are separated by four delimiters, and the four delimiters are removed, then the five tokens become one token. For example, if a text field comprises five tokens of "MNO Bank credit card payment," then after removing the space character delimiters, the five tokens are transformed into one token of "MNOBankcreditcardpayment."

In one embodiment, once the second stripped text field data is generated at GENERATING SECOND STRIPPED TEXT FIELD DATA OPERATION 217, process flow proceeds to DETERMINING KEY TEXT DATA OPERATION 218.

In one embodiment, at DETERMINING KEY TEXT DATA OPERATION 218, the transaction grouping module 170 determines key text data. In one embodiment, the key text data is determined based on the second stripped text field data. In one embodiment, the key text data represents instances of the text fields with both numeric characters and delimiter characters removed.

In one embodiment, the key text data comprises instances of text fields in which a plurality of tokens was transformed into one token through the removal of delimiters. In one embodiment, the instances of text fields of the second stripped text field data act as keys. In one embodiment, there are pointers connecting each text field of the second stripped text field data that points to the respective text field of the first stripped text field data. In one embodiment, the pointers allow for grouping the text fields of the first stripped text field data based on a respective instance of the text field of the second stripped text field data.

In one embodiment, once the key text data is determined at DETERMINING KEY TEXT DATA OPERATION 218, process flow proceeds to GENERATING KEY TEXT FIELD GROUP DATA OPERATION 219.

In one embodiment, at GENERATING KEY TEXT FIELD GROUP DATA OPERATION 219, the transaction grouping module 170 generates key text field group data. In one embodiment, the key text field group data is generated based on the key text data and the associated first stripped text field data. In one embodiment, the key text field group data represents a group of text fields. In one embodiment, the group of text fields are associated with the respective key text data. In one embodiment, each text field of a group of the text field group data shares a key text of the key text data. In one embodiment, a group is based on a shared key text. In one embodiment, a grouping of text fields by a key text enables a grouping of transactions that are similar to each other. In one embodiment, grouped text fields are similar to each other when the differences between such grouped text fields are numeric characters and delimiter characters.

In one embodiment, once the key text field group data is generated at GENERATING KEY TEXT FIELD GROUP DATA OPERATION 219, process flow proceeds at TO 230 OF FIG. 2B OPERATION 220.

In one embodiment, once process flow proceeds at TO 230 OF FIG. 2B OPERATION 220 of FIG. 2A, process flow proceeds at FROM 220 OF FIG. 2A OPERATION 230 of FIG. 2B.

In one embodiment, once process flow proceeds at FROM 220 OF FIG. 2A OPERATION 230, process flow proceeds to DETECTING AN INCONSISTENCY OPERATION 231.

In one embodiment, at DETECTING AN INCONSISTENCY OPERATION 231, the transaction grouping module 170 detects an inconsistency. In one embodiment, the inconsistency is detected within the key text field group data. In one embodiment, the inconsistency represents a delimiter inconsistency of a delimiter being absent. In one embodiment, the inconsistency represents a delimiter inconsistency of a delimiter being present. In one embodiment, inconsistencies are examined for differences in delimiters in grouped text fields that have had numeric characters removed and which share a key text that has had delimiters removed. In one embodiment, if no inconsistency is detected with a first grouping based on a first key text, then a second grouping based on a second key text is iterated.

In one embodiment, once an inconsistency is detected at DETECTING AN INCONSISTENCY OPERATION 231, process flow proceeds to DETERMINING PAIR DATA OPERATION 232.

In one embodiment, at DETERMINING PAIR DATA OPERATION 232, the ratio determination module 180 determines pair data. In one embodiment, the pair data represents a pair of a paired unigram of the key text field group data and a paired bigram of the key text field group data. In one embodiment, the paired unigram and the paired bigram are equivalent.

In one embodiment, each unigram of a group of the key text field group data is iterated and compared to each bigram of the group of the key text field group data. In one embodiment, if the comparison indicates there are differences between such unigrams and bigrams, then they are not paired. If the comparison indicates that there are no differences between such unigrams and bigrams, then they are paired. In one embodiment, such pairing allows for the frequency of the unigram to be compared to the frequency of the bigram, in order to determine which delimitation is correct.

In one embodiment, once the pair data is determined at DETERMINING PAIR DATA OPERATION 232, process flow proceeds to DETERMINING PAIR RATIO DATA OPERATION 233.

In one embodiment, at DETERMINING PAIR RATIO DATA OPERATION 233, the ratio determination module 180 determines pair ratio data. In one embodiment the pair ratio data is determined based on the pair data. In one embodiment, the pair ratio data represents a pair ratio indicating the relative counts of unigrams and bigrams. In one embodiment, a pair ration is a count of a unigram in relation to a count of a bigram. In one embodiment, a pair ratio is a count of a bigram in relation to a count of a unigram. A ratio may be expressed in many ways, such as two numbers with a colon between them (e.g., "1:4"), two numbers with a slash between the (e.g., "1/4"), a real number (e.g. 0.25), a percentage (e.g., 25%), and any other ratio expression as discussed herein, or as known in the art at the time of filing, or as developed, or becomes available, after the time of filing. In one embodiment, a pair ratio is an indication of the relative frequency of a specific unigram in comparison to a specific bigram within the text fields of a set of transaction. In one embodiment, a pair ratio is an indication of the relative frequency of a specific bigram in comparison to a specific unigram within the text fields of a set of transaction. In one embodiment, the pair ratio is based on a respective unigram counter of the unigram count data that is associated with the paired unigram. In one embodiment, the pair ratio is based on a respective bigram counter of the bigram count data associated with the paired bigram. In one embodiment, the par ratio data exceeds a threshold value of 1.5.

Although exceeding a threshold value can be described as a ratio being greater than 1.5 (e.g., "6/2>1.5"), it is to be understood that a threshold value can also be described as being less than 0.66 (e.g., "2/6<0.66"). It is also to be understood that other threshold values can be chosen, such as 2.0, 3.0, and other threshold values as discussed herein, or as known in the art at the time of filing, or as developed, or becomes available, after the time of filing.

In one embodiment, once the pair ratio data is determined at DETERMINING PAIR RATIO DATA OPERATION 233, process flow proceeds to GENERATING CORRECTED TEXT FIELD DATA OPERATION 234.

In one embodiment, at GENERATING CORRECTED TEXT FIELD DATA OPERATION 234, the correction module 190 generates corrected text field data. In one embodiment, the corrected text field data is generated from the transaction text field data associated with the pair data. In one embodiment, the corrected text field data is generated based on the pair ratio data exceeding the threshold value. In one embodiment, the corrected text field data is restricted to group unigrams and group bigrams of the key text field group data.

In one embodiment, the corrected text field data is generated by replacing the paired unigram with the paired bigram. In one embodiment, the pair ratio data is a ratio of the respective bigram counter over the respective unigram counter. In one embodiment, the corrected text field data is generated by replacing the paired bigram with the paired unigram. In one embodiment, the pair ratio data is a ratio of the respective unigram counter over the respective bigram counter. In one embodiment, the larger respective counter indicates the type of correction of delimiters that can be made.

In one embodiment, the corrected text field data is utilized by a machine learning module to correct new text fields of new transactions in real time. In one embodiment, the corrected text field data is utilized as a signal for a supervised machine learning module in real-time. In one embodiment, a supervised machine learning module is trained to generalize the correction of text in a text field. In one embodiment, a supervised machine learning module generates a mapping between original text and corresponding corrected text, based, for example, on a sequence-to-sequence learning model, and other learning models as discussed herein, or as known in the art at the time of filing, or as developed, or becomes available, after the time of filing.

In one embodiment, once the corrected text is generated at GENERATING CORRECTED TEXT FIELD DATA OPERATION 234, process flow proceeds to EXIT OPERATION 235.

In one embodiment, at EXIT OPERATION 235, the process 200 for correction of acquired transaction text fields is exited.

Exemplary Environment

Figure 3:
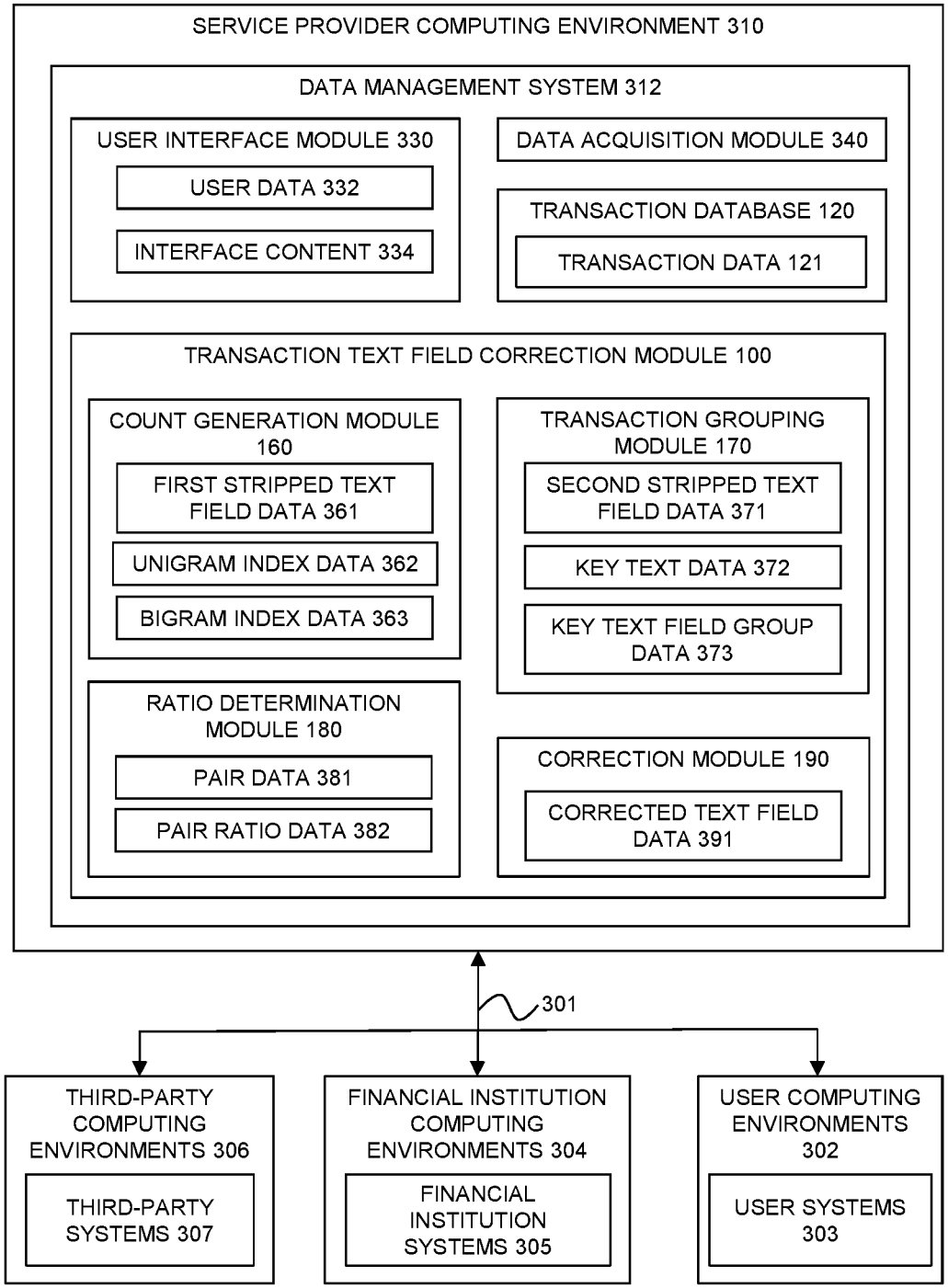
FIG. 3 is a functional block diagram of a production environment for correction of acquired transaction text fields, in accordance with one embodiment.

FIG. 3 is a functional block diagram of a production environment 300 for correction of acquired transaction text fields, in accordance one embodiment. It is to be understood that the diagram of FIG. 3 is for exemplary purposes and is not meant to be limiting. For example, the data management system 312 may apply to any manner of transactions, such as social media posting transaction management, financial transaction management, real estate transaction management, governmental electronic governance transaction management, and any other data management system as discussed herein, or as known in the art at the time of filing, or as developed, or becomes available, after the time of filing. In one embodiment, a transaction can include, but is not limited to, any operation through which ownership or control of any item or right is transferred from one party to another party. One specific illustrative example of a transaction is a financial transaction.

Referring to FIGS. 1 and 3 together, in this specific illustrative example, the production environment 300 includes a service provider computing environment 310, user computing environments 302, financial institution computing environments 304, and third-party computing environments 306, according to various embodiments. The computing environments 310, 302, 304, and 306 are communicatively coupled to each other with one or more communication channels 301, according to various embodiments. Communication channels 301 may include one or more physical or virtual networks.

The service provider computing environment 310 includes the data management system 312, which is configured to provide transaction management services to a plurality of users. According to one embodiment, the data management system 312 is an electronic financial accounting system that assists users in bookkeeping or other financial accounting practices. Additionally, or alternatively, the data management system 312 can manage one or more of tax return preparation, banking, investments, loans, credit cards, real estate investments, retirement planning, bill pay, budgeting, and any other data management system as discussed herein, or as known in the art at the time of filing, or as developed, or becomes available, after the time of filing. The data management system 312 can be a standalone system that provides transaction management services to users. Alternatively, the data management system 312 can be integrated into other software or service products provided by a service provider.

In one embodiment, the data management system 312 can assist users in tracking expenditures and revenues by retrieving transaction data related to transactions of users. The data management system 312 may include a data acquisition module 340, a user interface module 330, a transaction database 120, and a transaction text field correction module 100, according to various embodiments.

The user computing environments 302 correspond to computing environments of the various users of the data management system 312. The user computing environments 302 may include user systems 303. The users of the data management system 312 utilize the user computing environments 302 to interact with the data management system 312. The users of the data management system 312 can use the user computing environments 302 to provide data to the data management system 312 and to receive data, including transaction management services, from the data management system 312.

The user interface module 330 of the data management system 312 is configured to receive user data 332 from the users, according to one embodiment. The user data 332 may be derived from information, such as, but not limited to, a user's name, personally identifiable information related to the user, authentication data that enables the user to access the data management system 312, or any other types of data that a user may provide in working with the data management system 312.

In one embodiment, the user interface module 330 provides interface content 334 to the user computing environments 302. The interface content 334 can include data enabling a user to obtain the current status of the user's financial accounts. For example, the interface content 334 can enable the user to select among the user's financial accounts in order to view transactions associated with the user's financial accounts. The interface content 334 can enable a user to view the overall state of many financial accounts. The interface content 334 can also enable a user to select among the various options in the data management system 312 in order to fully utilize the services of the data management system 312.

In one embodiment, the data acquisition module 340 of the data management system 312 is configured to receive from the financial institution systems 305 one or more transactions associated with the user. In one embodiment, the data acquisition module 340 stores the received transactions as transaction data 121.

In one embodiment, the data management system 312 includes a transaction database 120. The transaction database 120 includes the transaction data 121. The transaction data 121 may be derived from data indicating the current status of all of the financial accounts of all of the users of the data management system 312. Thus, the transaction database 120 can include a vast amount of data related to the transaction management services provided to users. In one embodiment, when the user utilizes the user interface module 330 to view interface content 334, the interface content 334 includes the transaction data 121 retrieved from the transaction database 120. In one embodiment, the transaction data 121 represents at least one transaction. In one embodiment, a transaction includes fields for user, merchant, category, description, date, amount, and other transaction fields as discussed herein, or as known in the art at the time of filing, or as developed, or becomes available, after the time of filing.

In one embodiment, the data acquisition module 340 is configured to use the financial institution authentication data provided in the user data 332 to acquire transaction data 121 related to transactions of the users from the financial institution systems 305 of the financial institution computing environments 304. In addition, the data acquisition module 340 may use the financial institution authentication data to log into the online services of third-party computing environments 306 of third-party institutions in order to retrieve transaction data 121 related to the transactions of users of the data management system 312. The data acquisition module 340 accesses the financial institutions by interfacing with the financial institution computing environments 304. The transaction data of the financial institution systems 305 may be derived from bank account deposits, bank account withdrawals, credit card transactions, credit card balances, credit card payment transactions, online payment service transactions, loan payment transactions, investment account transactions, retirement account transactions, mortgage payment transactions, rent payment transactions, bill pay transactions, budgeting information, or any other types of transactions as discussed herein, or as known in the art at the time of filing, or as developed, or becomes available, after the time of filing. The data acquisition module 340 is configured to gather the transaction data 121 from financial institution computing environments 304 related to financial service institutions with which one or more users of the data management system 312 have a relationship.

In one embodiment, the data acquisition module 340 is configured to acquire data from third-party systems 307 of third-party computing environments 306. The data acquisition module 340 can request and receive data from the third-party computing environments 306 to supply or supplement the transaction data 121, according to one embodiment. In one embodiment, the third-party computing environments 306 automatically transmit transaction data to the data management system 312 (e.g., to the data acquisition module 340), to be merged into the transaction data 121. The third-party computing environment 306 can include, but is not limited to, financial service providers, state institutions, federal institutions, private employers, financial institutions, social media, clearinghouses, gateways, and any other business, organization, or association that has maintained financial data, that currently maintains financial data, or which may in the future maintain financial data, as discussed herein, or as known in the art at the time of filing, or as developed, or becomes available, after the time of filing.

In one embodiment, the data management system 312 includes the transaction text field correction module 100. In one embodiment, the transaction text field correction module 100 includes a count generation module 160, a transaction grouping module 170, a ratio determination module 180 that utilizes the results of the count generation module 160 and the transaction grouping module 170, and a correction module 190 that utilizes the results of the ratio determination module 180. In one embodiment, the transaction text field correction module 100 interacts with the transaction data of the transaction database 120.

In one embodiment, the count generation module 160 receives the transaction data 121 of the transaction database 120 that had been acquired from the financial institution systems 305, and, in one embodiment, the third-party systems 307. In one embodiment, the transaction data 121 represents one or more transactions having text fields that include description, user, merchant, category, date, amount, and other text fields as discussed herein, or as known in the art at the time of filing, or as developed, or becomes available, after the time of filing. In one embodiment, the transaction database 120 contains billions of transactions represented by the transaction data 121. In one embodiment, the count generation module 160 selects a set of the transaction data 121, such as one million transactions.

FIG. 4 is a specific illustrative example of text field data 400 for correction of acquired transaction text fields, in accordance with one embodiment. Referring to FIGS. 1, 3, and 4 together, in one embodiment, the table 400 includes a column 411 that represents a set of transaction data 121 received from the transaction database 120. The column 411 includes rows 421, 422, 423, 423, 424, 425, 426, 427, 428, 429, and 430, which are exemplary text fields. For the received transactions in column 411, there are three rows of text fields related to ABC Store, such as row 421 of "ABCSTORE 2578 ABC BI ABC BILL WA," row 422 of "ABCSTORE 2578 ABC BILL ABC BILLWA," and row 423 of "ABCSTORE 3762 ABC BILL ABC BILL WA." For the received transactions in column 411, there are two rows of text fields related to DEF Store, such as row 424 of "DEF STORE MKTPLACE PMTS DEF BILL WA" and row 425 of "DEFSTORE PMTS DEF BILL WA." For the received transactions in column 411, there are five rows of text fields related to MNO Bank, such as row 426 of "MNOBANK ONLINE PYMT AUTH DATE 08-M AY," row 427 of "MNOBANK ONLINE PYMT AUTHDATE 07-MAY," row 428 of "MNOBANK ONLINE PYMT AUTHDATE 08-MAY," row 429 of "MNOBANK ONLINE PYMT AUTHDATE 09-MAY," and row 430 of "MNOBANK ONLINE PYMT AUTH DATE 09-JUN."

As can be seen in column 411 of the selected text fields, this example incudes several potential errors. An error may be "BILLWA" in row 422, which could reflect a deleted space and could be "BILL WA." Another error may be "AUTH DATE" in rows 426 and 430, which could reflect an inserted space and could be "AUTHDATE." Another error may be "M ay" in row 426, which could reflect an inserted space and could be "May."

In one embodiment, the count generation module 160 generates first stripped text field data 361 from the selected transaction data 121. In one embodiment, the first stripped text field data 361 represents text fields that have had numeric characters removed. In one embodiment, numeric characters include digit characters, such as zero, one, two, three, four, five, six, seven, eight, nine, and any other digit character as discussed herein, or as known in the art at the time of filing, or as developed, or becomes available, after the time of filing. In one embodiment, numeric characters include punctuation characters that are associated with digits, such as hyphens, periods, slashes, commas, semicolons, and any other punctuation character as discussed herein, or as known in the art at the time of filing, or as developed, or becomes available, after the time of filing. In one embodiment, numeric characters are removed from text fields by stripping the numeric characters from the text field to generate a stripped text field.

Column 412 illustrates first stripped text field data 361 in which digits and punctuation, such as a hyphen, have been removed. For the first stripped text fields in column 412, there are ten rows of stripped text fields that correspond to the selected text fields of column 411. Row 421 of "ABC-STORE ABC BI ABC BILL WA" has had "2578" removed. Row 422 of "ABCSTORE ABC BILL ABC BILLWA" has had "2578" removed. Row 423 of "ABCSTORE ABC BILL ABC BILL WA" has had "3762" removed. Row 424 of "DEFSTORE MKTPLACE PMTS DEF BILL WA" has not been changed from the row in column 411. Row 425 of "DEFSTORE PMTS DEF BILL WA" has not been changed from the row in column 411. Row 426 of "MNOBANK ONLINE PYMT AUTH DATE M AY" has had "08-" removed. Row 427 of "MNOBANK ONLINE PYMT AUTHDATE MAY" has had "07-" removed. Row 428 of "MNOBANK ONLINE PYMT AUTHDATE MAY" has had "08-" removed. Row 429 of "MNOBANK ONLINE PYMT AUTHDATE MAY" has had "09-" removed. Row 430 of "MNOBANK ONLINE PYMT AUTH DATE JUN" has had "09-" removed.

In one embodiment, the count generation module 160 generates unigram index data 362 based on the first stripped text field data 361. In one embodiment, a unigram is generated by selecting one token from the text field that is separated from other tokens by a delimiter character, such as a space character. In one embodiment, the count generation module 160 determines a counter of each unigram generated in the unigram index data 362, and includes the counter in the unigram index data 362.

FIG. 5 is a specific illustrative example of unigram index data 500 for correction of acquired transaction text fields, in accordance with one embodiment. Referring to FIGS. 1, 3, 4, and 5 together, column 511 reflects unigrams that are extracted from the stripped text fields of column 412. Column 512 reflects the counters of each unigram that is found in the stripped text fields of column 412. The unigram index data 500 includes forty rows. Row 521 includes the unigram of "ABCSTORE" with a counter of 3. Row 522 includes the unigram of "ABC" with a counter of 6. Row 523 includes the unigram of "BI" with a counter of 1. Row 524 includes the unigram of "BILL" with a counter of 6. Row 525 includes the unigram of "WA" with a counter of 4. Row 526 includes the unigram of "BILLWA" with a counter of 1. Row 527 includes the unigram of "DEFSTORE" with a counter of 2. Row 528 includes the unigram of "MKTPLACE" with a counter of 1. Row 529 includes the unigram of "PMTS" with a counter of 2. Row 530 includes the unigram of "DEF" with a counter of 2. Row 531 includes the unigram of "MNOBANK" with a counter of 5. Row 532 includes the unigram of "ONLINE" with a counter of 5. Row 533 includes the unigram of "PYMT" with a counter of 5. Row 534 includes the unigram of "AUTH" with a counter of 2. Row 535 includes the unigram of "DATE" with a counter of 2. Row 536 includes the unigram of "M" with a counter of 1. Row 537 includes the unigram of "AY" with a counter of 1. Row 538 includes the unigram of "AUTH-DATE" with a counter of 3. Row 539 includes the unigram of "MAY" with a counter of 3. Row 540 includes the unigram of "JUN" with a counter of 1.

In one embodiment, the count generation module 160 generates bigram index data 363 based on the first stripped text field data 361. In one embodiment, a bigram is generated by selecting two contiguous tokens from the text field that is separated from other tokens by a delimiter character, such as a space character. In one embodiment, a bigram is represented by the two tokens without a delimiter between the two tokens. In one embodiment, the count generation module 160 determines a counter of each bigram generated in the bigram index data 363, and includes the counter in the bigram index data 363.

FIG. 6 is a specific illustrative example of bigram index data 600 for correction of acquired transaction text fields, in accordance with one embodiment. Referring to FIGS. 1, 3, 4, 5, and 6 together, column 611 reflects bigrams that are extracted from the stripped text fields of column 412. Column 612 reflects the counters of each bigram that is found in the stripped text fields of column 412. The bigram index data 600 includes forty one rows. Row 621 includes the bigram of "ABCSTORE|ABC" with a counter of 3. Row 622 includes the bigram of "ABC|BI" with a counter of 1. Row 623 includes the bigram of "BI|ABC" with a counter of 1. Row 624 includes the bigram of "ABC|BILL" with a counter of 5. Row 625 includes the bigram of "BILL|WA" with a counter of 5. Row 626 includes the bigram of "BILL|ABC" with a counter of 2. Row 627 includes the bigram of "DEFSTORE|MKTPLACE" with a counter of 1. Row 628 includes the bigram of "MKTPLACE|PMTS" with a counter of 1. Row 629 includes the bigram of "PMTS|DEF" with a counter of 2. Row 630 includes the bigram of "DEF|BILL" with a counter of 2. Row 631 includes the bigram of "DEFSTORE|PMTS" with a counter of 1. Row 632 includes the bigram of "MNOBANK|ONLINE" with a counter of 5. Row 633 includes the bigram of "ONLINE|PYMT" with a counter of 5. Row 634 includes the bigram of "PYMT|AUTH" with a counter of 2. Row 635 includes the bigram of "AUTH|DATE" with a counter of 2. Row 636 includes the bigram of "DATE|M" with a counter of 1. Row 637 includes the bigram of "MAY" with a counter of 1. Row 638 includes the bigram of "PYMT|AUTH-DATE" with a counter of 3. Row 639 includes the bigram of "AUTHDATE|MAY" with a counter of 3. Row 640 includes the bigram of "DATE|JUN" with a counter of 1. Row 641 includes the bigram of "ABC|BILLWA" with a counter of 1. It is to be understood that the vertical line character in the bigrams is for illustrative purposes, and represents the location where a space is located between the tokens.

In one embodiment, the transaction grouping module 170 generates second stripped text field data 371 from the selected transaction data 121. In one embodiment, the second stripped text field data 371 represents text fields that have had numeric characters removed and have had delimiter characters removed.

In one embodiment, numeric characters include digit characters, such as zero, one, two, three, four, five, six, seven, eight, nine, and any other digit character as discussed herein, or as known in the art at the time of filing, or as developed, or becomes available, after the time of filing. In one embodiment, numeric characters include punctuation characters that are associated with digits, such as hyphens, periods, slashes, commas, semicolons, and any other punctuation character as discussed herein, or as known in the art at the time of filing, or as developed, or becomes available, after the time of filing. In one embodiment, numeric characters are removed from text fields by stripping the numeric characters from the text field to generate a stripped text field.

In one embodiment, delimiter characters include the space character, such as the character that is included in text by a user pressing on the spacebar of a keyboard, and any other space character as discussed herein, or as known in the art at the time of filing, or as developed, or becomes available, after the time of filing. In one embodiment, delimiter characters include characters that are associated with delimiters such as carriage returns, commas, semicolons, periods, and other delimiter characters as discussed herein, or as known in the art at the time of filing, or as developed, or becomes available, after the time of filing. In one embodiment, delimiter characters are removed from text fields by stripping the delimiter characters from the text field to generate a stripped text field.

Column 413 illustrates second stripped text field data 371 in which digits, punctuation such as a hyphen, and spaces have been removed. For the second stripped text fields in column 413, there are ten rows of stripped text fields that correspond to the selected text fields of column 411 and column 412. Row 421 of "ABC STOREABCBIABC-BILLWA" has had "2578" and spaces removed. Row 422 of "ABCSTOREABCBILLABCBILLWA" has had "2578" and spaces removed. Row 423 of "ABCSTOREABCBILL-ABCBILLWA" has had "3762" and spaces removed. Row 424 of "DEFSTOREMKTPLACEPMTSDEFBILLWA" has had spaces removed. Row 425 of "DEFSTOREPMTSDEF-BILLWA" has had spaces removed.

Row 426 of "MNOBANKONLINEPYMTAUTH-DATEMAY" has had "08-" and spaces removed. Row 427 of "MNOBANKONLINEPYMTAUTHDATEMAY" has had "07-" and spaces removed. Row 428 of "MNOBANKONLINEPYMTAUTHDATEMAY" has had "08-" and spaces removed. Row 429 of "MNOBANKON-LINEPYMTAUTHDATEMAY" has had "09-" and spaces removed. Row 430 of "MNOBANKONLINEPYMTAUTH-DATEJUN" has had "09-" and spaces removed.

In one embodiment, the transaction grouping module 170 determines key text data 372 based on the second stripped text field data 371. In one embodiment, the key text data 372 represents two or more transactions having identical text fields when numeric characters and space characters are removed, such as the text fields in the second stripped text field data 371.

In one embodiment, the transaction grouping module 170 generates key text field group data 373 based on the key text data 372 and the associated first stripped text field data 361. In one embodiment, the key text field group data 373 groups text fields together based on their association with the respective key text data 372.

FIG. 7 is a specific illustrative example of key text group data 700 for correction of acquired transaction text fields, in accordance with one embodiment. Referring to FIGS. 1, 3, 4, 5, 6, and 7 together, in one embodiment, the column 711 represents the key text data 372. In one embodiment, the rows 422 and 423 of column 413 have identical second stripped text fields of "ABCSTOREABCBILLABC-BILLWA," which is a key text field in the rows 721 and 722 of the column 711. In one embodiment, the associated rows 422 and 423 of column 412 are part of a first key text field group 731. The first key text field group 731 is represented in column 712 at row 721 of "ABCSTORE ABC BILL ABC BILLWA" and at row 722 of "ABCSTORE ABC BILL ABC BILL WA."

In one embodiment, the rows 426, 427, 428, and 429 of column 413 have identical second stripped text fields of "MNOBANKONLINEPYMTAUTHDATEMAY," which is a key text field in the rows 723, 724, 725, and 726 of the column 711. In one embodiment, the associated rows 426, 427, 428, and 429 of column 412 are part of a second key text field group 732. The second key text field group 732 is represented in column 712 at row 723 of "MNOBANK ONLINE PYMT AUTH DATE M AY," at row 724 of "MNOBANK ONLINE PYMT AUTHDATE MAY," at row 725 of "MNOBANK ONLINE PYMT AUTHDATE MAY," and at row 726 of "MNOBANK ONLINE PYMT AUTH-DATE MAY."

In one embodiment, the transaction grouping module 170 detects an inconsistency within the key text field group data 373. In one embodiment, such detection is for a respective key text field group that has an identical key text but has variances in the key text field group. For example, the row 721 in the column 712 has an inconsistency because it contains the text "BILLWA" while the row 722 in the column 712 contains the text "BILL WA." For further example, the row 723 in the column 712 has an inconsistency because it contains the text "M AY" while the rows 724, 725, and 726 in the column 712 contain the text "MAY."

In one embodiment, the transaction grouping module 170 prevents a token of a text field from being corrected to a token that is not a member of the tokens of the key text field group data 373. For example, any correction to a text field associated with the row 721 at column 711 of "ABCSTORE-ABCBILLABCBILLWA" would be restricted to a unigram or a bigram of the first key text field group 731. For further example, any correction to a text field associated with the row 723 at column 711 of "MNOBANKONLINEPYMT-AUTHDATEMAY" would be restricted to a unigram or a bigram of the second key text field group 732.

In one embodiment, the ratio determination module 180 determines pair data 381. In one embodiment, the pair data 381 represents pairs of paired unigrams of the key text field group data 373 and paired bigrams of the key text field group data 373. In one embodiment, the paired unigram and the paired bigram are equivalent.

FIG. 8 is a specific illustrative example of pair ratio data 800 for correction of acquired transaction text fields, in accordance with one embodiment. Referring to FIGS. 1, 3, 4, 5, 6, 7, and 8 together, row 801 of the ratio data 800 illustrates that the ratio data 800 is for the key text data 372 of "ABCSTOREABCBILLABCBILLWA" illustrated in rows 721 and 722 of column 711. In one embodiment, the column 811 represents the candidate unigrams of the first key text field group data 373, as represented in rows 721 and 722 of column 712. In one embodiment, the candidate unigrams in column 811 are illustrated in row 821 as "ABCSTORE," in row 822 as "ABC," in row 823 as "BILL," in row 824 as "WA," and in row 825 as "BILLWA."

In one embodiment, the column 812 represents the candidate bigrams of the first key text field group data 373, as represented in rows 721 and 722 of column 712. In one embodiment, the candidate bigrams in column 812 are illustrated in row 821 as "ABCSTORE|ABC," in row 822 as "ABC|BILL," in row 823 as "BILL|ABC," in row 824 as "ABC|BILLWA," and in row 825 as "BILL|WA." It is to be understood that the vertical line character in the bigrams is for illustrative purposes, and represents the location where a space is located between the tokens. As can be seen in the ratio data 800, there is one pair of an equivalent unigram and bigram in row 825 of "BILLWA."

In one embodiment, the ratio determination module 180 determines pair ratio data 382. In one embodiment, the pair ratio data 382 is based on the pair data 381 of a paired unigram and a paired bigram. In one embodiment, the pair ratio data 382 is based on a respective unigram counter of the unigram index data 362 associated with the paired unigram. In one embodiment, the pair ratio data 382 is based on a respective bigram counter of the bigram index data 363 associated with the paired bigram. In one embodiment, the pair ratio data 382 is based on a ratio exceeding a threshold value, such as 1.5. In one embodiment, the pair ratio data 382 is a ratio of unigram counters over bigram counters. In one embodiment, the pair ratio data 382 is a ratio of bigram counters over unigram counters.

In one embodiment, the pair data 381 in row 825 of columns 811 and 812 indicates a paired unigram of "BILLWA" and a paired bigram of "BILL|WA." Referring to FIG. 5, the unigram in column 511 of "BILLWA" in row 526 has a counter in column 512 of "1." Referring to FIG. 6, the bigram in column 611 of "BILL|WA" in row 625 has a counter in column 612 of "5." As shown in the column 813 for row 825, the ratio of unigram over bigram is "1/5=0.2." This ratio does not exceed the exemplary threshold of 1.5. As shown in the column 814 for row 825, the ratio of bigram over unigram is "5/1=5.0." This ratio does exceed the exemplary threshold of 1.5. Accordingly, since the exemplary threshold is exceeded, the bigram of "BILL|WA" will replace the unigram of "BILLWA" in the transaction data 121, which will include a space between "BILL" and "WA."

FIG. 9 is a specific illustrative example of pair ratio data 900 for correction of acquired transaction text fields, in accordance with one embodiment. Referring to FIGS. 1, 3, 4, 5, 6, 7, 8, and 9 together, row 901 of the ratio data 900 illustrates that the ratio data 900 is for the key text data 372 of "MNOBANKONLINEPYMTAUTHDATEMAY" illustrated in rows 723, 724, 725, and 726 of column 711. In one embodiment, the column 911 represents the candidate unigrams of the second key text field group data 373, as represented in rows 723, 724, 725, and 726 of column 712. In one embodiment, the candidate unigrams in column 911 are illustrated in row 921 as "MNOBANK," in row 922 as "ONLINE," in row 923 as "PYMT," in row 924 as "AUTHDATE," in row 925 as "AUTH," in row 926 as "DATE," in row 927 as "MAY," in row 928 as "M," and in row 929 as "AY." In one embodiment, the candidate bigrams in column 912 are illustrated in row 921 as "MNOBANK|ONLINE," in row 922 as "ONLINE|PYMT," in row 923 as "PYMT|AUTH," in row 924 as "AUTH|DATE," in row 925 as "PYMT|AUTHDATE," in row 926 as "DATE|M," in row 927 as "MAY," and in row 928 as "AUTHDATE|MAY." It is to be understood that the vertical line character in the bigrams is for illustrative purposes, and represents the location where a space is located between the tokens. As can be seen in the ratio data 800, there are two pairs of equivalent unigrams and bigrams in row 924 of "AUTHDATE" and in row 927 of "MAY."

In one embodiment, the pair data 381 in row 924 of columns 911 and 912 indicates a paired unigram of "AUTHDATE" and a paired bigram of "AUTH|DATE." Referring to FIG. 5, the unigram in column 511 of "AUTHDATE" in row 538 has a counter in column 512 of "3." Referring to FIG. 6, the bigram in column 611 of "AUTH|DATE" in row 635 has a counter in column 612 of "2." As shown in the column 913 for row 924, the ratio of unigram over bigram is "3/2=1.5." This ratio does not exceed the exemplary threshold of 1.5. As shown in the column 914 for row 924, the ratio of bigram over unigram is "2/3=0.6." This ratio also does not exceed the exemplary threshold of 1.5. Accordingly, since neither threshold exceeds the exemplary threshold value of 1.5, there will be no corresponding change to the transaction data 121 for the respective transaction.

In one embodiment, the pair data 381 in row 927 of columns 911 and 912 indicates a paired unigram of "MAY" and a paired bigram of "MAY." Referring to FIG. 5, the unigram in column 511 of "MAY" in row 539 has a counter in column 512 of "3." Referring to FIG. 6, the bigram in column 611 of "MAY" in row 637 has a counter in column 612 of "1." As shown in the column 913 for row 927, the ratio of unigram over bigram is "3/1=3.0." This ratio exceeds the exemplary threshold of 1.5. As shown in the column 914 for row 927, the ratio of bigram over unigram is "1/3=0.3." This ratio does not exceed the exemplary threshold of 1.5. Accordingly, since the exemplary threshold is exceeded due to the count of unigrams being three times greater than the count of bigrams, the unigram of "MAY" will replace the bigram of "MAY" in the transaction data 121, which will remove the space between "M" and "AY."

In one embodiment, the correction module 190 generates corrected text field data 391. In one embodiment the corrected text field data 391 is generated based on the pair ratio data 382 exceeding a threshold value. In one embodiment, the corrected text field data 391 is based on a correction as indicated by the pair ratio data 382 indicating that a bigram is to replace a unigram, or a unigram is to replace a bigram.

FIG. 10 is a specific illustrative example of corrected transaction data 1000 for correction of acquired transaction text fields, in accordance with one embodiment. Referring to FIGS. 1, 3, 4, 5, 6, 7, 8, 9, and 10 together, column 1011 indicates the original text fields as selected from the transaction data 121. The row 1021 for column 1011 has the text of "ABCSTORE 2578 ABC BILL ABC BILLWA," which corresponds to the row 422 and column 411 of FIG. 4. The row 1022 for column 1011 has the text of "MNOBANK ONLINE PYMT AUTH DATE 08-M AY," which corresponds to the row 426 and column 411 of FIG. 4.

Column 1012 indicates the corrected text fields. The row 1021 for column 1012 has the text of "ABCSTORE 2578 ABC BILL ABC BILL WA," which includes the correction of inserting a space character between "BILL" and "WA." The row 1022 for column 1012 has the text of "MNOBANK ONLINE PYMT AUTH DATE 08-MAY," which includes the correction of removing the space character between "M" and "AY."

In one embodiment, the corrected transaction data 1000 is utilized for supervised learning with a machine learning model. In one embodiment, a supervisor, such as a domain expert, determines that an institution avoids the insertion of delimiters within text fields, in comparison to the other institutions that accidentally insert such delimiters. In one embodiment, a large quantity of transactions, such as millions of transactions, are collected from this institution. In this embodiment, the text fields of the large quantity of transactions are considered to be correct and are compared for inconsistencies with text fields of similar transactions of other institutions, in which those similar transactions have had numeric characters removed. In an alternative embodiment, a supervisor, such as a domain expert, corrects incorrect text fields to generate corrected text fields. In this embodiment, the incorrect text fields paired with the corrected text fields are the basis for a supervised machine learning framework that learns the corrections. In this embodiment, the corrected text fields are represented by a feature vector using feature extraction techniques. Alternatively in this embodiment, the corrected text fields are utilized by deep learning techniques, embedding techniques, long-short term memory layer techniques, sequence-to-sequence mapping techniques, and other techniques as discussed herein, or as known in the art at the time of filing, or as developed, or becomes available, after the time of filing.

Term Definitions

Various embodiments of systems and methods described herein include one or more computers, which may be referred to herein as computing systems or processors. As used herein the term computer includes any programmable machine or machines capable of performing arithmetic and/or logical operations. In various embodiments, computers include one or more of processors, memories, data storage devices, and/or other known or novel components as discussed herein, and/or as known in the art at the time of filing, and/or as developed after the time of filing. In various embodiments, these components are connected physically or through network or wireless links. In various embodiments, computers include software which directs the operations of the aforementioned components.

Herein, computers may be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term application includes, but is not limited to, any system or software program capable of being implemented on a computing system, accessed through one or more servers, accessed through a network, accessed through a cloud, and/or provided through any system or by any means, as discussed herein, and/or as known in the art at the time of filing, and/or as developed after the time of filing.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial data management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

As used herein, the terms artificial intelligence, machine learning, and machine learning algorithms include, but are not limited to, machine learning algorithms for predictive model training operations such as one or more of artificial intelligence operations, regression, logistic regression, decision trees, artificial neural networks, support vector machines, linear regression, nearest neighbor methods, distance based methods, naive Bayes, linear discriminant analysis, k-nearest neighbor algorithm, another query classifier, and any other presently known or later developed predictive model training operations, according to one embodiment.

Herein, the terms model and machine learning model may be used interchangeably and include, but are not limited to, to any predictive model used to provide output data and/or predictions data to one or more systems or applications. Examples of models and machine learning models include, but are not limited to, supervised machine learning models, unsupervised machine learning models, semi-supervised machine learning models, deep learning machine learning models, and/or any other form or type of model used to provide output data and/or predictions data to one or more systems or applications as discussed herein, and/or as known in the art at the time of filing, and/or as developed after the time of filing.

Herein, the terms system and application system may be used interchangeably and include, but are not limited to, various components used to provide functionality and operations associated with an application. Examples of application system components include, but are not limited to, application customization components, predictive models, and various component interfaces.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented method comprising:

selecting transaction data representing a set of transactions of a data management system, wherein the transaction data comprises transaction text field data representing text fields of the set of transactions;

generating first stripped text field data from the transaction text field data, wherein the first stripped text field data represents the text fields with numeric characters removed;

generating unigram index data based on the first stripped text field data, wherein the unigram index data represents extracted unigrams from the text fields with numeric characters removed;

determining unigram count data based on the unigram index data and the first stripped text field data, wherein the unigram count data represents unigram counters of the extracted unigrams;

generating bigram index data based on the first stripped text field data, wherein the bigram index data represents extracted bigrams from the text fields with numeric characters removed;

determining bigram count data based on the bigram index data and the first stripped text field data, wherein the bigram count data represents bigram counters of the extracted bigrams;

generating second stripped text field data from the transaction text field data, wherein the second stripped text field data represents the text fields with numeric characters and delimiter characters removed;

determining key text data based on the second stripped text field data, wherein the key text data represents instances of the text fields with numeric characters and delimiter characters removed;

generating key text field group data based on the key text data and the associated first stripped text field data, wherein the key text field group data represents a group of text fields associated with the respective key text data;

detecting an inconsistency within the key text field group data;

determining pair data representing a pair of a paired unigram of the key text field group data and a paired bigram of the key text field group data, wherein the paired unigram and the paired bigram are equivalent;

determining pair ratio data based on the pair data, wherein the pair ratio data represents a pair ratio that is based on a respective unigram counter of the unigram count data associated with the paired unigram and based on a respective bigram counter of the bigram count data associated with the paired bigram, wherein the pair ratio data exceeds a threshold value; and generating corrected text field data from the transaction text field data associated with the pair data, wherein the corrected text field data is based on the pair ratio exceeding the threshold value.

2. The computing system implemented method of claim 1, wherein the transaction data is derived from a plurality of web scraping algorithms.

3. The computing system implemented method of claim 1, wherein the numeric characters comprise digit characters.

4. The computing system implemented method of claim 1, wherein the numeric characters comprise digit characters and punctuation characters.

5. The computing system implemented method of claim 1, wherein the delimiter characters comprise space characters.

6. The computing system implemented method of claim 1, wherein the delimiter characters comprise space characters and punctuation characters.

7. The computing system implemented method of claim 1, wherein the inconsistency represents a delimiter inconsistency of a delimiter being absent.

8. The computing system implemented method of claim 1, wherein the inconsistency represents a delimiter inconsistency of a delimiter being present.

9. The computing system implemented method of claim 1, wherein the corrected text field data is restricted to group unigrams and group bigrams of the key text field group data.

10. The computing system implemented method of claim 1, wherein generating the corrected text field data from the transaction text field data associated with the pair data comprises replacing the paired unigram with the paired bigram, wherein the pair ratio data is a ratio of the respective bigram counter over the respective unigram counter.

11. The computing system implemented method of claim 1, wherein generating the corrected text field data from the transaction text field data associated with the pair data comprises replacing the paired bigram with the paired unigram, wherein the pair ratio data is a ratio of the respective unigram counter over the respective bigram counter.

12. A system comprising:
at least one processor; and
at least one memory coupled to the at least one processor, the at least one memory having stored therein instructions which when executed by any set of the at least one processor, perform a process, the process including:
selecting transaction data representing a set of transactions of a data management system, wherein the transaction data comprises transaction text field data representing text fields of the set of transactions;

generating first stripped text field data from the transaction text field data, wherein the first stripped text field data represents the text fields with numeric characters removed;

generating unigram index data based on the first stripped text field data, wherein the unigram index data represents extracted unigrams from the text fields with numeric characters removed;

determining unigram count data based on the unigram index data and the first stripped text field data, wherein the unigram count data represents unigram counters of the extracted unigrams;

generating bigram index data based on the first stripped text field data, wherein the bigram index data represents extracted bigrams from the text fields with numeric characters removed;

determining bigram count data based on the bigram index data and the first stripped text field data, wherein the bigram count data represents bigram counters of the extracted bigrams;

generating second stripped text field data from the transaction text field data, wherein the second stripped text field data represents the text fields with numeric characters and delimiter characters removed;

determining key text data based on the second stripped text field data, wherein the key text data represents instances of the text fields with numeric characters and delimiter characters removed;

generating key text field group data based on the key text data and the associated first stripped text field data, wherein the key text field group data represents a group of text fields associated with the respective key text data;

detecting an inconsistency within the key text field group data;

determining pair data representing a pair of a paired unigram of the key text field group data and a paired bigram of the key text field group data, wherein the paired unigram and the paired bigram are equivalent;

determining pair ratio data based on the pair data, wherein the pair ratio data represents a pair ratio that is based on a respective unigram counter of the unigram count data associated with the paired unigram and based on a respective bigram counter of the bigram count data associated with the paired bigram, wherein the pair ratio data exceeds a threshold value; and generating corrected text field data from the transaction text field data associated with the pair data, wherein the corrected text field data is based on the pair ratio exceeding the threshold value.

13. The system of claim 12, wherein the transaction data is derived from a plurality of web scraping algorithms.

14. The system of claim 12, wherein the numeric characters comprise digit characters.

15. The system of claim 12, wherein the numeric characters comprise digit characters and punctuation characters.

16. The system of claim 12, wherein the delimiter characters comprise space characters.

17. The system of claim 12, wherein the delimiter characters comprise space characters and punctuation characters.

18. The system of claim 12, wherein the inconsistency represents a delimiter inconsistency of a delimiter being absent.

19. The system of claim 12, wherein the inconsistency represents a delimiter inconsistency of a delimiter being present.

20. The system of claim 12, wherein the corrected text field data is restricted to group unigrams and group bigrams of the key text field group data.

21. The system of claim 12, wherein generating the corrected text field data from the transaction text field data associated with the pair data comprises replacing the paired unigram with the paired bigram, wherein the pair ratio data is a ratio of the respective bigram counter over the respective unigram counter.

22. The system of claim 12, wherein generating the corrected text field data from the transaction text field data associated with the pair data comprises replacing the paired bigram with the paired unigram, wherein the pair ratio data is a ratio of the respective unigram counter over the respective bigram counter.

\* \* \* \* \*